(12) United States Patent
Andersson et al.

(10) Patent No.: US 6,811,227 B2
(45) Date of Patent: Nov. 2, 2004

(54) FIRM CUSHION

(75) Inventors: Christer Andersson, Trollhättan (SE); Bengt Andreasson, Uddevalla (SE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/395,771

(22) Filed: Mar. 24, 2003

(65) Prior Publication Data

US 2004/0189078 A1 Sep. 30, 2004

(51) Int. Cl.⁷ ............................................. A47C 7/02
(52) U.S. Cl. ........................ 297/452.49; 297/216.1
(58) Field of Search ......................... 297/216.1, 452.49, 297/452.18, 452.29, 452.33, 452.34

(56) References Cited

U.S. PATENT DOCUMENTS

| | | | |
|---|---|---|---|
| 1,430,248 A | * | 9/1922 | Morse .................... 297/452.49 |
| 3,138,404 A | | 6/1964 | Newton |
| 3,328,085 A | * | 6/1967 | Schwartz et al. ....... 297/452.49 |
| 3,463,547 A | | 8/1969 | Brennan et al. |
| 3,583,759 A | | 6/1971 | Kramer |
| 3,740,096 A | | 6/1973 | Bridger |
| 3,770,235 A | | 11/1973 | Klapproth et al. |
| 3,816,674 A | | 6/1974 | Andrews, Jr. et al. |
| 4,057,214 A | | 11/1977 | Harder, Jr. |
| 4,215,841 A | | 8/1980 | Herring, Jr. |
| 4,368,917 A | | 1/1983 | Urai |
| 4,418,958 A | | 12/1983 | Watkin |
| 4,498,649 A | | 2/1985 | Toll |
| 4,572,578 A | | 2/1986 | Perkins |
| 4,640,548 A | | 2/1987 | Desanta |
| 4,647,109 A | | 3/1987 | Christophersen et al. |
| 4,696,516 A | | 9/1987 | Yeum |
| 4,781,417 A | | 11/1988 | Shipman et al. |
| 5,096,153 A | | 3/1992 | Seeley et al. |
| 5,462,339 A | | 10/1995 | Schmale et al. |
| 5,551,756 A | | 9/1996 | Gurasich et al. |
| 5,611,598 A | | 3/1997 | Knoblock |
| 5,681,093 A | | 10/1997 | Pfister |
| 5,769,489 A | | 6/1998 | Dellanno |
| 5,772,281 A | | 6/1998 | Massara |
| 5,839,782 A | | 11/1998 | Kashiwamura et al. |
| 5,857,750 A | | 1/1999 | Kashiwamura et al. |
| 5,876,085 A | | 3/1999 | Hill |
| 5,895,096 A | | 4/1999 | Massara |
| 6,036,266 A | | 3/2000 | Massara |
| 6,062,642 A | * | 5/2000 | Sinnhuber et al. ....... 297/216.13 |
| 6,129,419 A | | 10/2000 | Neale |
| 6,158,815 A | * | 12/2000 | Sugie et al. ........... 297/452.61 |
| 6,168,239 B1 | | 1/2001 | Conner et al. |

* cited by examiner

*Primary Examiner*—Milton Nelson, Jr.
(74) *Attorney, Agent, or Firm*—Bill C. Panagos

(57) ABSTRACT

A vehicle seat structure having a one-piece flexible shell incorporated in the seating surface portion and a one-piece flexible shell incorporated in the backrest portion, wherein dampener structures are provided between the shell and the seat frame for added comfort and vibration isolation.

17 Claims, 6 Drawing Sheets

FIRM CUSHION

FIELD OF THE INVENTION

The invention relates to a seat structure and more particularly to a vehicle seat structure having a one-piece flexible shell used for the seating surface and a one-piece flexible shell for the backrest, each shell having dampening means provided between the shell and the seat frame.

BACKGROUND OF THE INVENTION

Seats used in automobiles, trucks, and other vehicles may be relatively complex structures. Conventional vehicle seats included a structural frame, springs, and padding that are upholstered with cloth, leather or vinyl. New developments in vehicle seat design have lead to incorporating foam and other engineering materials to eliminate inner spring construction. Generally, a specially contoured frame is covered with foam on all sides and a complex cover is fabricated to encase the entire vehicle seat structure with cloth, leather or vinyl.

Vehicle seats must meet standards for strength and durability. In addition, vehicle seats must offer design flexibility to allow them to be adapted to various passenger compartment configurations, adjustment mechanisms, and other accessories. Vehicle seats must also allow for efficient utilization of expensive seating fabrics and leather treatments that are frequently demanded by consumers.

Other important considerations in vehicle seat design are cost constraints. Vehicle seat designs should maximize efficient use of materials and ideally reduce labor requirements to provide maximum value.

It would be desirable to produce a vehicle seat structure which minimizes the complexity of the seat design and while maximizing passenger comfort.

SUMMARY OF THE INVENTION

Consistent and consonant with the present invention, a vehicle seat structure which minimizes the complexity of the seat design and while maximizing passenger comfort has surprisingly been discovered.

The vehicle seat structure comprises a support frame adapted to be connected to a vehicle frame; a seating surface portion connected to the support frame, the seating surface portion including a seating surface shell; a backrest portion pivotally connected to at least one of the support frame and the seating surface portion, the backrest portion including a backrest frame and a backrest shell; a plurality of seating dampener structures connecting the seating surface shell to the support frame to permit relative movement therebetween; and a plurality of backrest dampener structures connecting the backrest shell to the backrest frame to permit relative movement therebetween.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
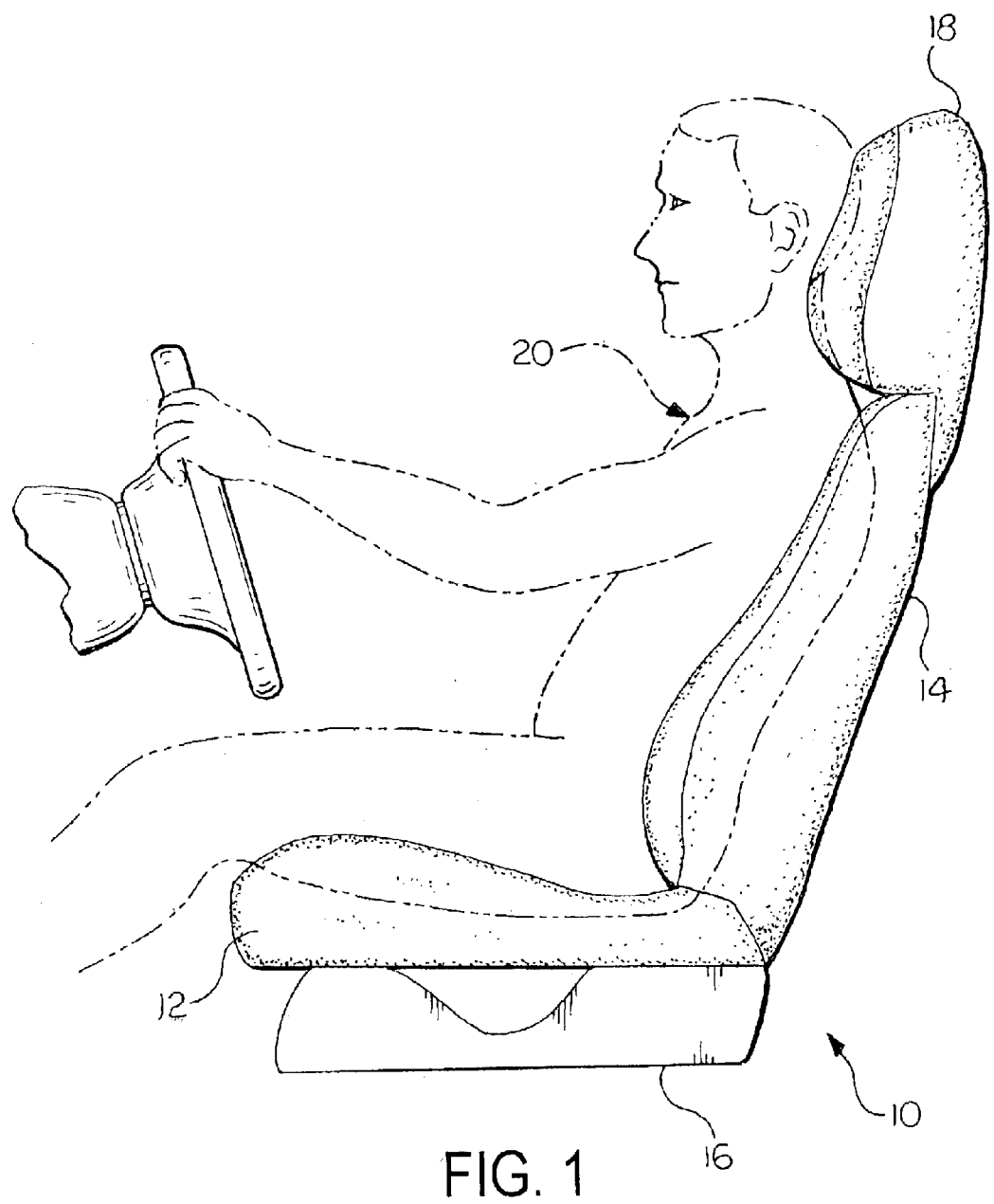
FIG. 1 is a schematic view shown in side elevation of a vehicle seat structure in accordance with the present invention.

Referring now to the drawings, and particularly FIG. 1, there is shown generally at 10 a vehicle seat structure incorporating the features of the invention. The vehicle seat structure 10 has a seating surface portion 12 and a backrest portion 14. The seating surface portion 12 is supported by a supporting frame 16, which is attached to a frame structure (not shown) of a vehicle. A headrest portion 18 is attached to a top portion of the backrest portion 14 to support the head of a passenger 20 of the vehicle.

Figure 2:
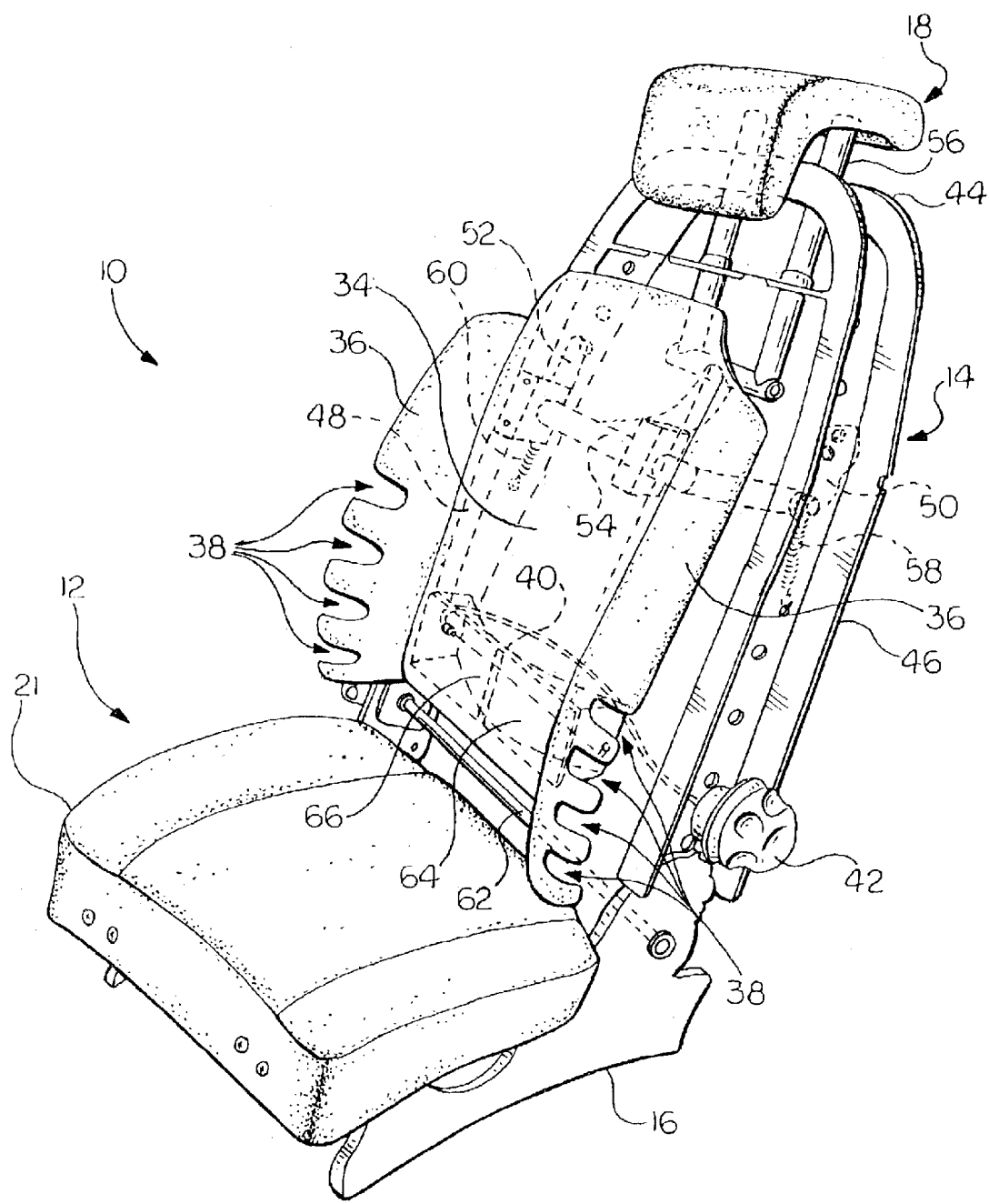
FIG. 2 is a perspective view of a vehicle seat structure in accordance with the present invention shown without padding and upholstery.
Figure 3:
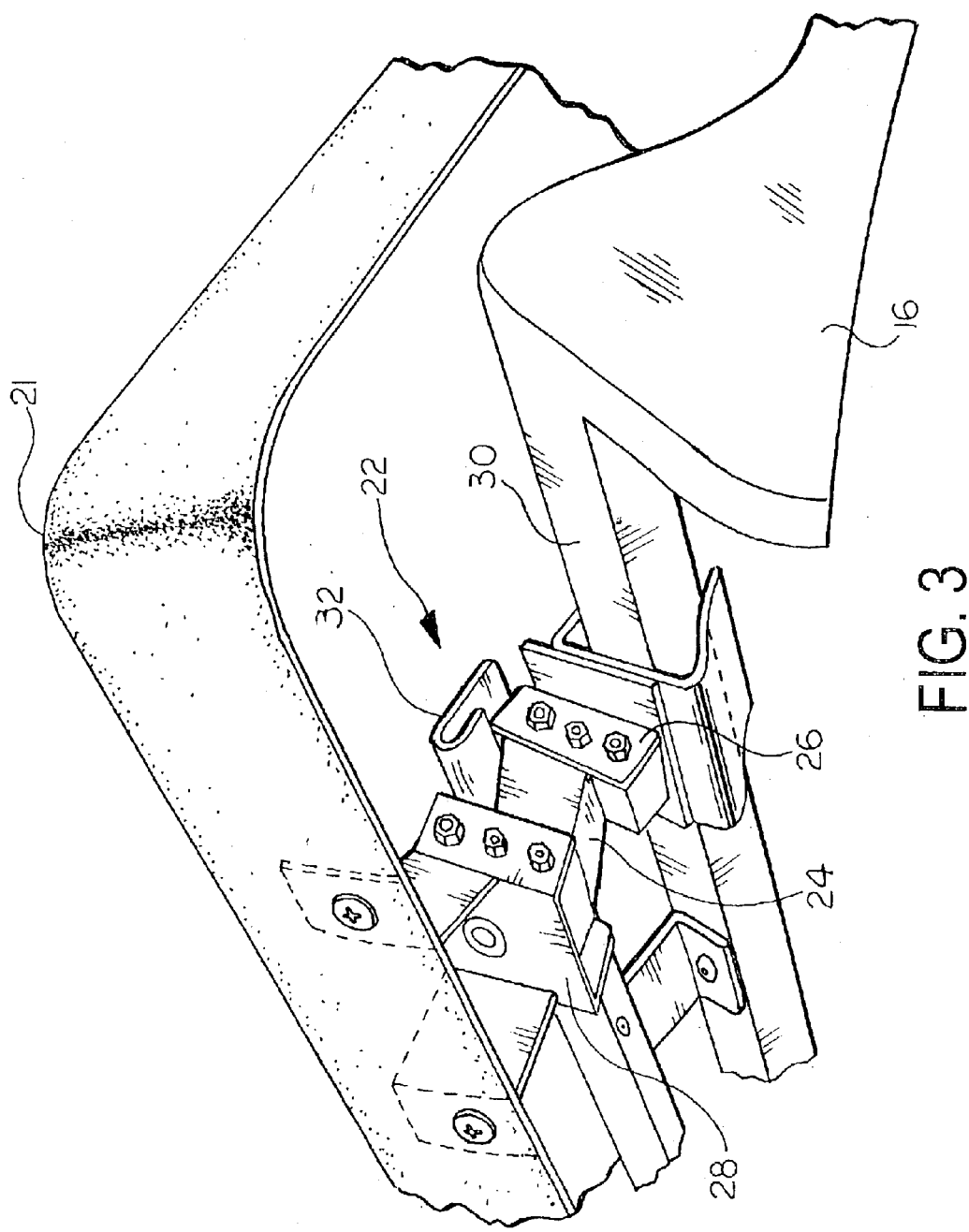
FIG. 3 is a partial perspective view of a seating surface dampening structure in accordance with the present invention.

Referring now to FIG. 2, there is shown the vehicle seat structure 10 without padding and upholstery. The seating surface portion 12 includes a seating surface shell 21 formed of plastic or other durable and flexible material and shaped to be a sitting surface of the vehicle seat structure 10. The seating surface shell 21 is coupled to the support frame by a plurality of dampener or suspension structures 22, as clearly illustrated in FIG. 3. In the embodiment shown, two dampener structures 22 are included at the front portion of the seating surface portion 12. At least one dampener structure 22 must also be included at the rear portion of the seating surface portion 12 to adequately support the seating surface portion 12. It is understood that more or fewer dampener structures 22 can be used as desired, without departing from the scope and spirit of the invention. The dampener structures 22 include a rubber coupling 24 disposed between a first bracket 26 and a second bracket 28. Other dampening structures can be used such as a mechanical active dampening type and a hydraulic active dampening type, for example.

The first bracket 26 is adapted to be received by a first rail 30 of the support frame 16 and a second rail 32 of the support frame 16. The first bracket 26 is slidable along the first rail 30 and the second rail 32. The second bracket 28 is connected to an inner surface of the seating surface portion 12.

The backrest portion 14 includes a backrest shell 34 formed of plastic or other durable and flexible material and shaped to be a backrest surface of the vehicle seat structure 10. A side bolster 36 is included on each side of the backrest shell 34. A plurality of slits 38 are provided on each bolster 36 for added flexibility. A lumbar support structure 40 is provided on the lower portion of the backrest shell 34. A lumbar support actuator 42 is operatively engaged with the lumbar support structure 40 and is disposed on a backrest frame 44. The backrest frame 44 includes a first upright leg 46 and a second upright leg 48. A first hinge 50 is pivotally mounted on an inner surface of the first leg 46. A second hinge 52 is pivotally mounted on an inner surface of the second leg 48.

A backrest mounting structure 54 supports the backrest shell 34 and is pivotally connected to the first hinge 50 and the second hinge 52 and slidingly connected with a headrest frame 56. One end of a first dampening structure or spring 58 is connected to the pivotal connection of the first hinge 50 and the backrest mounting structure 54. The other end of the first spring 58 is connected to the first leg 46. One end of a second dampening structure or spring 60 is connected to the pivotal connection of the second hinge and the backrest mounting structure 54. The other end of the second spring 60 is connected to the second leg 48. The backrest frame 44 is pivotally connected to the support frame 16 by an elongate rod 62. It is understood that other pivotal connecting structures could be used without departing from the scope and spirit of the invention. Other dampening structures can be used such as a mechanical active dampening type and a hydraulic active dampening type, for example.

In operation, as the weight of the passenger 20 is applied to the seating surface shell 21, the dampening structure 22 adjusts the position of the seating surface shell 21 according to the weight distribution. The first bracket 26 and the second bracket 28 are permitted to move relative to one another by the rubber coupling 24 to facilitate the position adjustment. The dampening structure 22 of the seating surface shell 21 also minimizes the amount of vibration transferred from the vehicle to the passenger 20.

As the weight of the passenger 20 is applied to the backrest shell 34, the first hinge 50 and the second hinge 52 are caused to pivot to adjust the position of the backrest shell 34 according to the weight distribution. The first spring 58 and the second spring 60 are connected to the first hinge 50 and the second hinge 52, respectively, as well as the backrest mounting structure 54, to assist in dampening vibration transferred from the vehicle. Thus, the springs 58, 60, the hinges 50, 52, and the backrest mounting structure 54 cooperate to minimize the amount of vibration transferred from the vehicle to the passenger 20. Additionally, the lumbar support structure 40 can be adjusted for the comfort of the passenger 20 as desired using the actuator 42. Turning the actuator 42 causes a first flap 64 and a second flap 66 to be urged forward into contact with the lumbar region of the back of the passenger 20 or rearward and out of contact with the lumbar region of the passenger 20.

The seating surface shell 21 and the backrest shell 34 each provide a unitary structure under the upholstery and padding of the vehicle seat structure 10 to evenly and comfortably support the passenger 20. Thus, the seating surface portion 12 and the backrest portion 14 cooperate to support the passenger 20 on the vehicle seat structure 10 and isolate the passenger 20 from the vibration of the vehicle.

Figure 4:
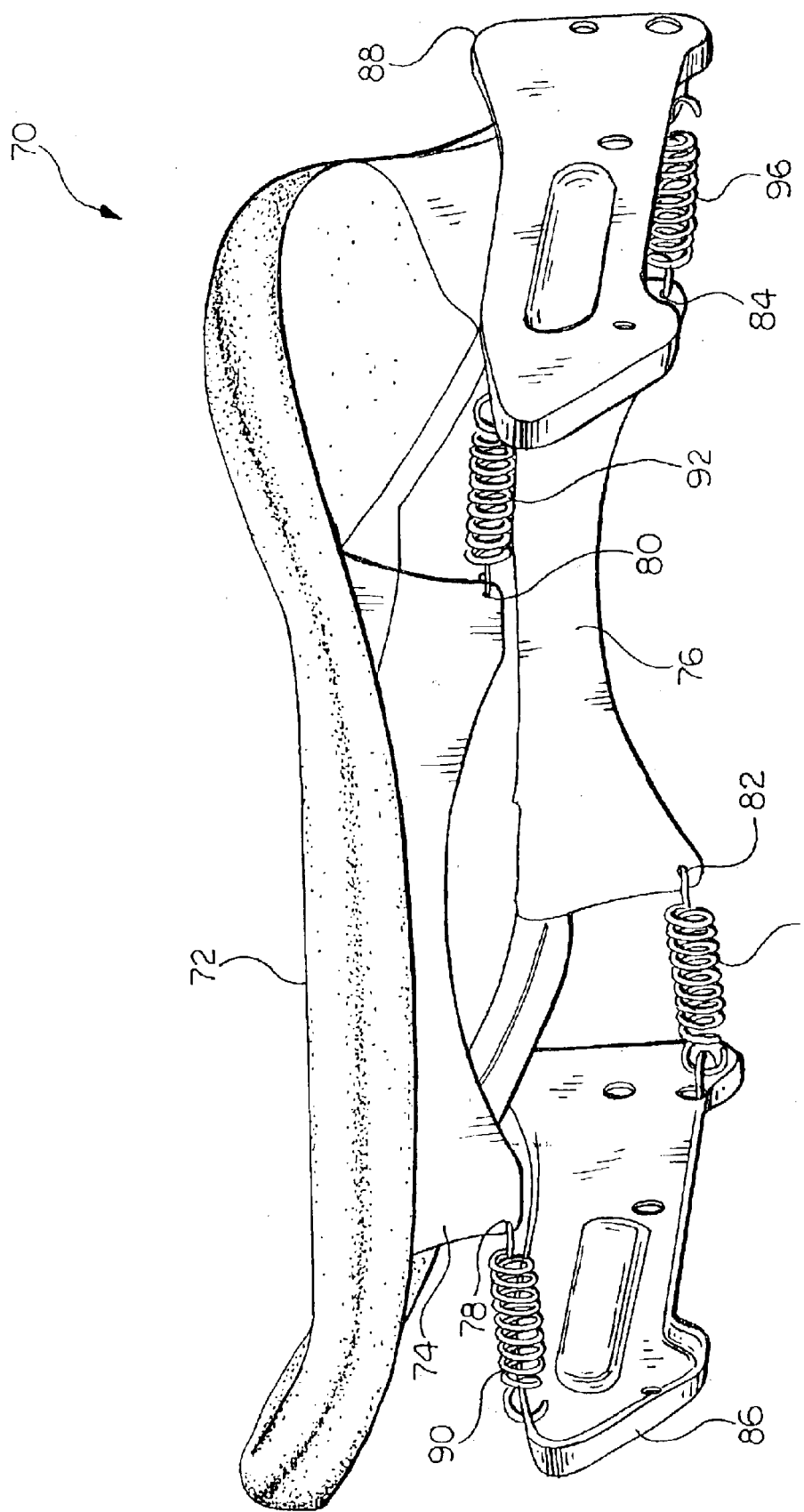
FIG. 4 is a perspective view of a second embodiment of the invention showing a seating surface supported by springs.

Referring now to FIG. 4, there is shown a second embodiment of the invention. A seating surface portion is shown generally at 70. The seating surface portion 70 includes a seating surface shell 72 formed of plastic or other durable and flexible material. A pair of elongate frame members 74, 76 depend from the seating surface shell 72. The frame members 74, 76 are spaced apart and substantially parallel. The frame member 74 includes an aperture 78, 80 formed in each end thereof. A pair of apertures 82, 84 is formed in each end of the frame member 76. A first rail 86 is disposed adjacent one end of the frame members 74, 76 and a second rail 88 is disposed adjacent the other end of the frame members 74, 76. The first rail 86 and the second rail 88 are adapted to be connected to a support frame (not shown). A plurality of dampening structures or springs 90, 92, 94, 96 have one end disposed in each of the apertures 78, 80, 82, 84. The other end of the spring 90 is connected to a first end of the rail 86, and the other end of the spring 92 is connected to the second end of the rail 86. Similarly, the other end of the spring 94 is connected to a first end of the rail 88, and the other end of the spring 96 is connected to a second end of the rail 88. Although four springs 90, 92, 94, 96 are shown, it is understood that more or fewer springs can be used as desired without departing from the scope and spirit of the invention.

Figure 5:
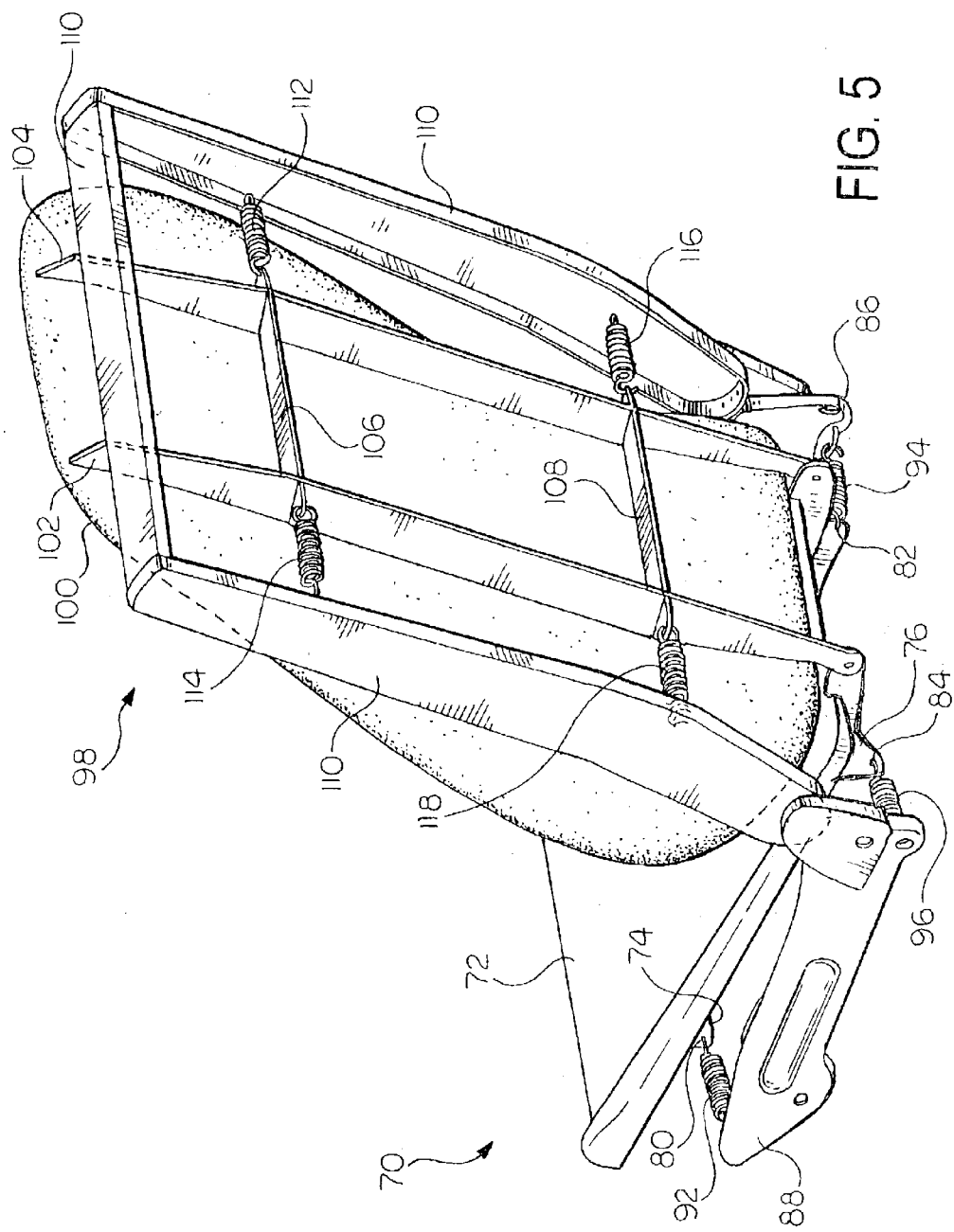
FIG. 5 is a perspective view of the seating surface illustrated in FIG. 4, also showing the backrest portion of the vehicle seat structure.

Referring now to FIG. 5, the seating surface portion 70 is shown connected to a backrest portion 98. The backrest portion 98 includes a backrest shell 100. The backrest shell includes a pair of elongate frame members 102, 104. The frame members 102, 104 are spaced apart and substantially parallel. One end of the frame members 102, 104 are hingedly connected to the seating surface portion 70 to permit pivotal movement therebetween. A first cross-brace 106 extends between the frame members 102, 104 adjacent one end thereof. A second cross-brace 108 extends between the frame members 102, 104 adjacent the other end thereof. A support frame 110 is hingedly connected to the first rail 86 and the second rail 88 of the seating surface portion 70 to permit pivotal movement therebetween. One end of a dampening strucure or spring 112 is connected to a first end of the first cross-brace 106 and one end of a dampening strucure or spring 114 is connected to a second end of the first cross brace 106. The other end of the springs 112, 114 is connected to the support frame 110. One end of a dampening strucure or spring 116 is connected to a first end of the second cross-brace 108 and one end of a dampening strucure or spring 118 is connected to a second end of the second cross brace 108. The other end of the springs 116, 118 is connected to the support frame 110. Although four springs 112, 114, 116, 118 are shown, it is understood that more or fewer springs can be used as desired without departing from the scope and spirit of the invention.

In operation, the springs 90, 92, 94, 96 and the springs 112, 114, 116, 118 permit the seating surface shell 72 and the backrest shell 100 to be isolated from the first rail 86, the second rail 88, and the support frame. The seating surface shall 72 and the backrest shell 100 are supported as a unitary structure. It is understood that the seating surface shell 72 and the backrest shell 100 can be supported independently of one another as shown in FIG. 2.

As the weight of a passenger (not shown) is applied to the seating surface shell 72, the springs 90, 92, 94, 96 cooperate to adjust the position of the seating surface shell 72 according to the weight distribution. The springs 90, 92, 94, 96 of the seating surface shell 72 also minimize the amount of vibration transferred from the vehicle to the passenger.

As the weight of the passenger is applied to the backrest shell 100, the springs 112, 114, 116, 118 cooperate to adjust the position of the backrest shell 100 according to the weight distribution. The springs 112, 114, 116, 118 of the backrest shell 100 also minimize the amount of vibration transferred from the vehicle to the passenger.

The seating surface shell 72 and the backrest shell 100 each provide a unitary structure under the upholstery and padding of the vehicle seat structure to evenly and comfortably support the passenger. Thus, the seating surface portion 70 and the backrest portion 98 cooperate to support the passenger on the vehicle seat structure and isolate the passenger from the vibration of the vehicle.

Figure 6:
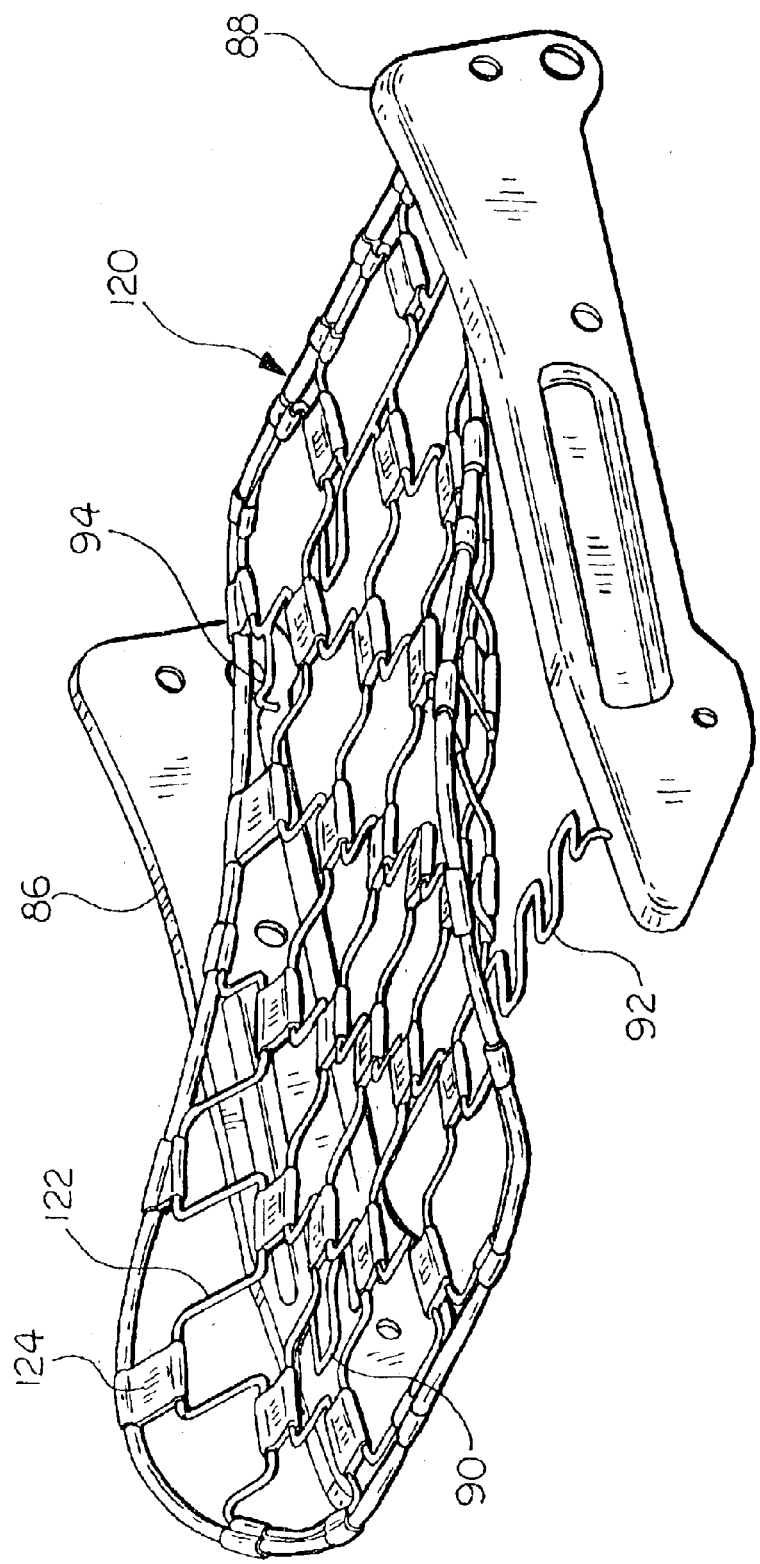
FIG. 6 is a perspective view of a third embodiment of the invention showing a seating surface wherein the shell is produced from a steel wire.

FIG. 6 illustrates a third embodiment of the invention wherein a seating surface shell 120 is formed by using a steel wire frame 122. Individual rows or strands of the wire frame 122 are held in a desired location by couplings 124. The couplings 124 in the embodiment shown are produced from plastic. However, it is understood that other conventional materials can be used such as steel in the form of a winding, for example, to hold the wire frame 122 in place.

In operation, the wire frame provides a flexible shell to provide added comfort to the passenger. The remaining structure and operation of the seating surface portion is substantially the same as that described in FIGS. 4 and 5. The backrest shell portion shown in FIG. 5 can be formed using a steel wire frame as well.

From the foregoing description, one ordinarily skilled in the art can easily ascertain the essential characteristics of this invention and, without departing from the spirit and scope thereof, can make various changes and modifications to the invention to adapt it to various usages and conditions. For example, additional slots or apertures can be added to the seating surface shell 21 and the backrest shell 34 to change the flexibility as desired.

What is claimed is:

1. A vehicle seat structure comprising:
    a support frame adapted to be connected to a vehicle frame;
    a seating surface portion connected to said support frame, said seating surface portion including a seating surface shell;
    a backrest portion pivotally connected to at least one of said support frame and said seating surface portion, said backrest portion including a backrest frame and a backrest shell pivotally connected to said backrest frame;
    a plurality of seating dampener structures connecting the seating surface shell to said support frame to permit relative movement therebetween; and
    a plurality of backrest dampener structures connecting the backrest shell to the backrest frame to permit relative movement therebetween.

2. The vehicle seat structure according to claim 1, wherein said backrest portion includes a pair of side bolsters extending outwardly therefrom.

3. The vehicle seat structure according to claim 2, wherein each of the side bolsters has a plurality of slits formed therein extending to a peripheral edge thereof to provide greater flexibility of the shell at the locations adjacent said slits.

4. The vehicle seat structure according to claim 1, wherein each of said seating dampener structures includes a first bracket connected to said support frame and a second bracket connected to the seating surface shell, the first bracket and the second bracket joined to permit relative movement therebetween.

5. The vehicle seat structure according to claim 4, wherein the first bracket and the second bracket are joined by a rubber coupling.

6. The vehicle seat structure according to claim 1, wherein said seating dampener structures are rubber couplings.

7. The vehicle seat structure according to claim 1, wherein said backrest shell is pivotally connected to said backrest frame at a bottom portion of said backrest shell.

8. The vehicle seat structure according to claim 1, wherein said backrest dampener structures are springs.

9. The vehicle seat structure according to claim 1, wherein said backrest shell is pivotally connected to said backrest frame via a hinge member, wherein said hinge member is pivotally connected to said backrest frame and said backrest shell.

10. A vehicle seat structure comprising:
    a seating surface portion adapted to be connected to a vehicle frame;
    a backrest portion pivotally connected to said seating surface portion, said backrest portion including a backrest frame and a backrest shell pivotally connected to said backrest frame;
    a plurality of backrest dampener structures connecting the backrest shell to the backrest frame to permit relative movement therebetween.

11. The vehicle seat structure according to claim 10, wherein said backrest portion includes a pair of side bolsters extending outwardly therefrom.

12. The vehicle seat structure according to claim 11, wherein each of the side bolsters has a plurality of slits formed therein extending to a peripheral edge thereof to provide greater flexibility of the shell at the locations adjacent said slits.

13. The vehicle seat structure according to claim 10, wherein said backrest dampener structures are springs.

14. The vehicle seat structure according to claim 10, wherein one of the backrest shell and seating surface portion is formed of a steel wire frame.

15. The vehicle seat structure according to claim 10, wherein said backrest shell is pivotally connected to said backrest frame at a bottom portion of said backrest shell.

16. The vehicle seat structure according to claim 10, wherein said backrest shell is pivotally connected to said backrest frame via a hinge member, wherein said hinge member is pivotally connected to said backrest frame and said backrest shell.

17. A vehicle seat structure comprising:
    a seating surface portion adapted to be connected to a vehicle frame;
    a backrest portion pivotally connected to said seating surface portion, said backrest portion including a backrest frame and a backrest shell; and
    a plurality of permit backrest dampener structures connecting the backrest shell to the backrest frame to permit relative movement therebetween;
    wherein said backrest portion includes a pair of side bolsters extending outwardly therefore, and wherein each of said side bolsters includes a plurality of slits extending to a peripheral edge thereof to provide greater flexibility of said backrest shell at the locations adjacent said slits.

* * * * *

UNITED STATES PATENT AND TRADEMARK OFFICE
CERTIFICATE OF CORRECTION

PATENT NO. : 6,811,227 B2
DATED : November 2, 2004
INVENTOR(S) : Christer Andersson et al.

It is certified that error appears in the above-identified patent and that said Letters Patent is hereby corrected as shown below:

Column 6,
Line 48, after "of" delete "permit".

Signed and Sealed this

First Day of February, 2005

JON W. DUDAS
*Director of the United States Patent and Trademark Office*